United States Patent [19]

Reifenhäuser et al.

[11] Patent Number: 4,594,063
[45] Date of Patent: Jun. 10, 1986

[54] EXTRUDER OR CALIBRATING DIE

[75] Inventors: Hans Reifenhäuser, Troisdorf; Heinz Beisemann, Cologne; Paul Reitemeyer, Troisdorf-Bergheim; Robert Grabowski, Troisdorf, all of Fed. Rep. of Germany

[73] Assignee: Reifenhauser GmbH & Co. Maschinenfabrik, Troisdorf, Fed. Rep. of Germany

[21] Appl. No.: 759,054

[22] Filed: Jul. 25, 1985

[30] Foreign Application Priority Data

Jul. 28, 1984 [DE] Fed. Rep. of Germany ....... 3427915

[51] Int. Cl.⁴ ...................... B29C 47/92; H01L 41/00
[52] U.S. Cl. .................... 425/141; 264/40.1; 264/176 R; 264/555; 310/26; 310/328; 425/140
[58] Field of Search ................ 264/40.1, 40.7, 176 R, 264/555; 425/140, 141; 310/328, 26

[56] References Cited

U.S. PATENT DOCUMENTS

| 3,040,221 | 6/1962 | Fitzner | 318/573 |
| 3,940,221 | 2/1976 | Nissel | 425/141 |
| 4,016,437 | 4/1977 | Calderara et al. | 310/8.7 |
| 4,126,031 | 11/1978 | Ignashev et al. | 72/285 |
| 4,305,704 | 12/1981 | Lemelson | 425/296 |

Primary Examiner—Jay H. Woo
Assistant Examiner—J. Cabaniss
Attorney, Agent, or Firm—Karl F. Ross; Herbert Dubno

[57] ABSTRACT

A die for a thermoplastic material with at least one output-gap-defining adjustable die lip, an opposing gap-bounding lip, at least one adjusting element working on the output-gap-defining die lip as well as a control and adjusting device for the thickness of the extruded plastic product, wherein the adjusting element is associated with and operated at least partially by the control and adjusting device. A field translator, either a piezotranslator or a magnetostriction translator, is employed as the adjusting element.

11 Claims, 2 Drawing Figures

EXTRUDER OR CALIBRATING DIE

CROSS REFERENCE TO RELATED APPLICATION

This application is related to the commonly owned copending application Ser. No. 06/759,053, filed 7/25/85.

FIELD OF THE INVENTION

Our present invention relates to a thermoplastic-forming device having a pair of lips from between which the plastic material emerges and specifically to extruder and calibrating or forming dies for thermoplastic material, and, more particularly, to dies in extruders for thermoplastic materials having an adjustable output gap width for control and adjustment of the thickness of the extruded plastic product.

BACKGROUND OF THE INVENTION

Prior art dies for thermoplastic materials used in extruder press units, calibrating or forming units and the like often comprise at least one output gap-defining adjustable die lip, an opposing gap-bounding lip, at least one gap-adjusting element working on the gap-defining adjustable die lip, and a control and adjusting device for controlling the thickness of the extruded plastic product and acting upon the adjusting element.

Extruder press units generally comprise the extruder head connected to a worm feed and the control and adjusting device.

The expression "die" as used herein includes both extruder dies and calibrating or forming dies which impart desired dimensions to a semifinished article.

An extruder may be constructed as a tapered nozzle die for extrusion of plates and foils, for extrusion of sections (structural shapes or profiles), hollow sections, pipes and tubing or for blown-foil manufacture. Commonly one such die unit is equipped with several adjusting elements, which are arranged in rows. To simplify the description the adjusting element is referred to in the singular.

In the known die units, for example as described in U.S. Pat. No. 3,940,221, the adjusting element is a metal bolt whose head is provided with threads and is screwed in a corresponding hole.

The shaft of this bolt is heatable by ohmic electric heat from a suitable heating element. Its thermal expansion determines the gap size adjustment. The heating element is associated with the control and adjusting device and at least partially operates it. It allows adjustment to a particular temperature in a given temperature range and it can be held at that temperature, until control and adjustment requires another gap size adjustment and therefore another temperature for the bolt shaft.

This system has several drawbacks. On the one hand the temperature change of the bolt occurs only slowly because of the physical basis of its mechanism, so that increased adjusting element equilibration times with significant disadvantages must be taken into account.

On the other hand injurious unavoidable temperature inhomogeneities of the bolt shaft affect the precision of the control or regulation, chiefly in the heated die, where undesirable control and adjusting couplings occur. As a result the prior art die unit may not produce a product with the narrow tolerances which are required in modern practice.

OBJECTS OF THE INVENTION

It is an object of our invention to provide a die unit, which produces product to precise thickness tolerances without disturbing, particularly lengthening, adjusting element equilibration times.

It is another object of our invention to provide an improved die for an extruder press unit, calibrating unit or the like.

It is a further object of our invention to provide a die unit having an improved precision and accuracy of operation, wherein extruded plastic products are produced to more exacting tolerances than those of the prior art.

It is yet another object of our invention to produce a die having an improved precision and accuracy of operation, but which is not unduly slowed by adjusting elements which do not equilibrate as fast as desired.

SUMMARY OF THE INVENTION

These objects and others which will become apparent hereinafter are attained in accordance with our invention in a die for an extruder press unit, calibrating unit or the like for thermoplastic materials comprising at least one output-gap-defining adjustable die lip, an opposing gap-bounding lip, at least one adjusting element working on the die lip, and a control and adjusting device for the thickness of the extruded product plastic material, operatively connected with the adjusting element.

According to our invention at least one adjusting element is a field translator.

The term "field translator" is here defined as an element which, when subjected to an electromagnetic field, either in the form of the application of a potential to the element or by placing the element in a magnetic field undergoes with a minimum of ohmic heating effect, a shape change which in one direction represents a linear force generation which is applied in this direction to displace a lip.

Field translators are known as adjusting elements in other areas vastly different from those which are involved in the present application. A piezotranslator and a magnetostriction translator are examples of such field translators. They operate according to the principles of the known piezoelectric or magnetostriction effects.

Field translators are electrically controllable. Correspondingly an applied control voltage can effectively change the length of a piezotranslator between a fraction of a micrometer to several millimeters.

The maximum extension as well as the force, the piezotranslator can produce, are dependent on the structure of the elements and can fit special applications. The resolution of a piezotranslator is theoretically unlimited in regard to the gap size adjustment and depends principally on the constants of the surroundings. Every voltage change is translated with minimum loss into a linear motion.

Piezotranslators can be set to particular extensions with extreme accuracy, and of course gap size adjustments to $1000\mu$, with adjustment precision to five nanometers/volt. They also provide especially fine adjustment and fast position adjustments in the $\mu$-sec range.

In the past they also have been used for oscillatory excitations. The same is true for the corresponding magnetostriction translator.

Preferably our invention operates with a piezotranslator. As far as we know field translators have not hitherto been used as adjusting elements in die units of the structure described here. Their use however leads to a surprising improvement of the allowable tolerances for the output product without disturbing particularly lengthening, adjusting element equilibration times. This improvement in the allowable tolerances is significant and could not have been expected. The field translator can work directly or through a force or motion transmission.

Usually in a lip-type die the output gap-defining extruder lip is adjustable against the operation of an elastic restoring force and vibratable with a definite eigenfrequency (intrinsic or natural vibration frequency).

Consequently difficulties can result, when the field translator is controlled dynamically. In this case according to our invention without difficulty and without disturbance the control and adjusting relationships operate in spite of the appearance of vibrations with a field translator as adjusting element, although a field translator displays for its part a vibratory mode structure with such natural resonance frequency.

In accordance with our invention the field translator has a resonance frequency below the lowest eigenfrequency or natural resonance frequency of the gap-defining die lip with its intrinsic restoring force.

The control and adjusting device is constructed so as to provide an output signal whose signal frequency is below the resonance frequency of the field translator. Also the opposing gap-bounding lip can be adjustable by a field translator as well.

It is understood that the field translator is so arranged that it does not experience a disturbing temperature change influence. This can be ensured by heat insulating measures. It is also understood further that a field translator can have several resonance frequencies. The above statements apply also to all resonance frequencies.

According to a preferred embodiment of our invention the gap-defining adjustable die lip is divided into a plurality of individual sections which are connected to one of the field translators.

BRIEF DESCRIPTION OF THE DRAWING

The above and other objects, features and advantages of our invention will become more readily apparent from the following description, reference being made to the accompanying drawing in which.

SPECIFIC DESCRIPTION

Figure 1:
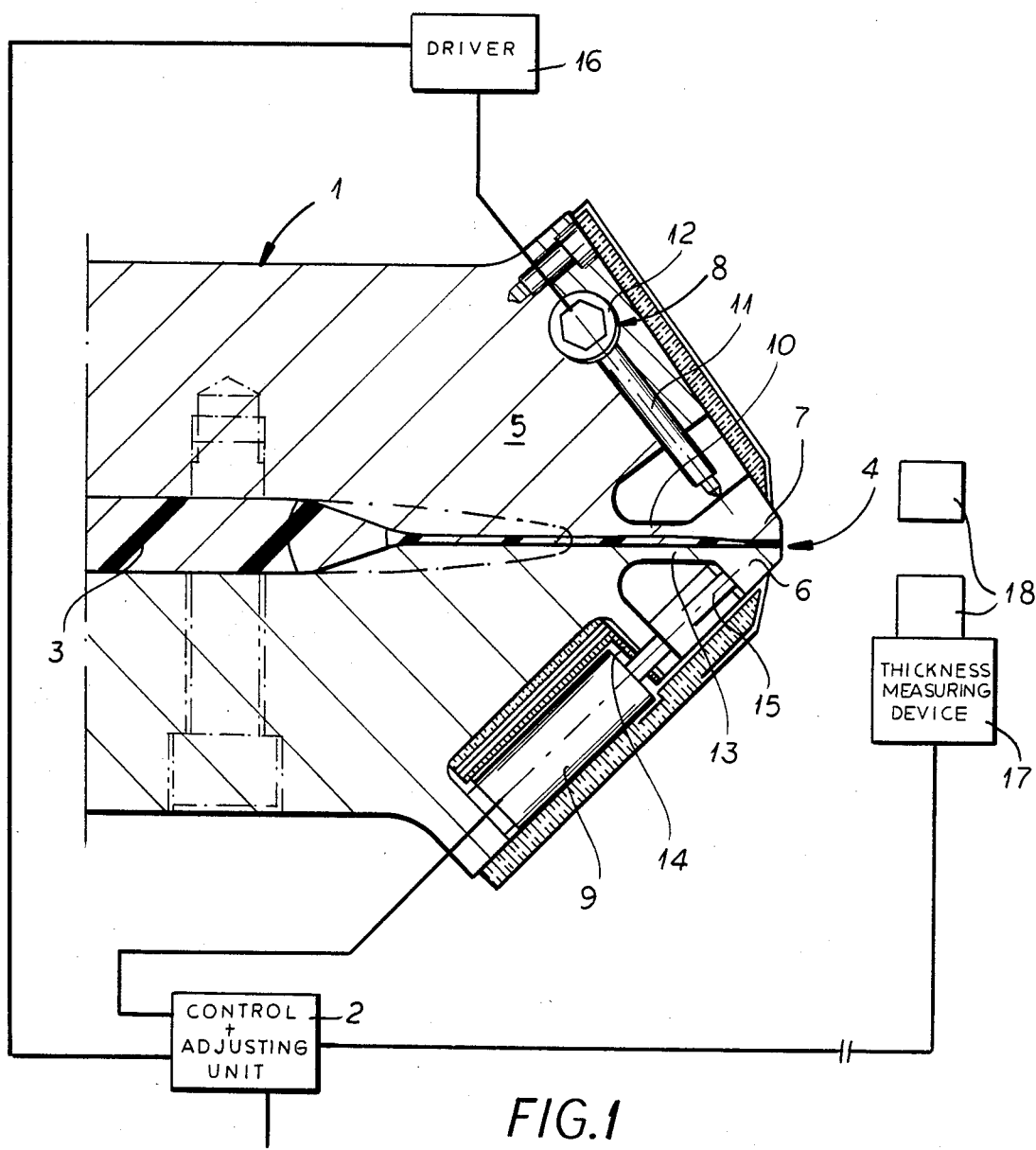
FIG. 1 is a partially cutaway vertical cross sectional, schematic view of an embodiment of the die unit of our invention.

The die unit shown in FIG. 1 comprises in its basic structure a die 1 with a control and adjusting device 2 and is structured for extrusion of thermoplastic material 3.

The die 1 shown in cross section has an output gap 4 in the die body 5, which has an output-gap-defining adjustable die lip 6 and an opposing gap-bounding lip 7.

The output gap 4 is (in the example provided here, but not necessarily) adjustable with the aid of a mechanical coarse adjusting mechanism 3 to a given gap width. The gap-defining adjusting die lip 6 is connected to at least one adjusting element 9, with which the control and adjusting device 2 for the thickness of the extruded plastic product is associated.

The opposing gap-bounding lip 7 is constructed as an adjustable structural component and the coarse adjusting mechanism works on the opposing gap-bounding lip 7.

As the adjusting element 9 a piezotranslater can be employed. The arrangement is such that the control and adjusting device 2 is equipped for a fine adjustment of the gap size of between 0.05 and 0.30 mm, preferably between 0.10 to 0.2 mm. The opposing gap-bounding lip 7 is connected by an elastically deformable opposing gap-bounding lip connecting member 10 to the die body 5 and is coarsely adjustable against an intrinsic elastic restoring force. The coarse adjusting device 8 has at least one coarse adjusting push rod 11 supported in the die body 5, which is operable by means of an eccentric adjusting driver 12. Similarly the piezotranslator 9 works on the output-gap-defining adjustable die lip 6, which connects by an elastic deformable extruder lip connecting member 13 to the die body 5 and is adjustable against an elastic restoring force.

Figure 2:
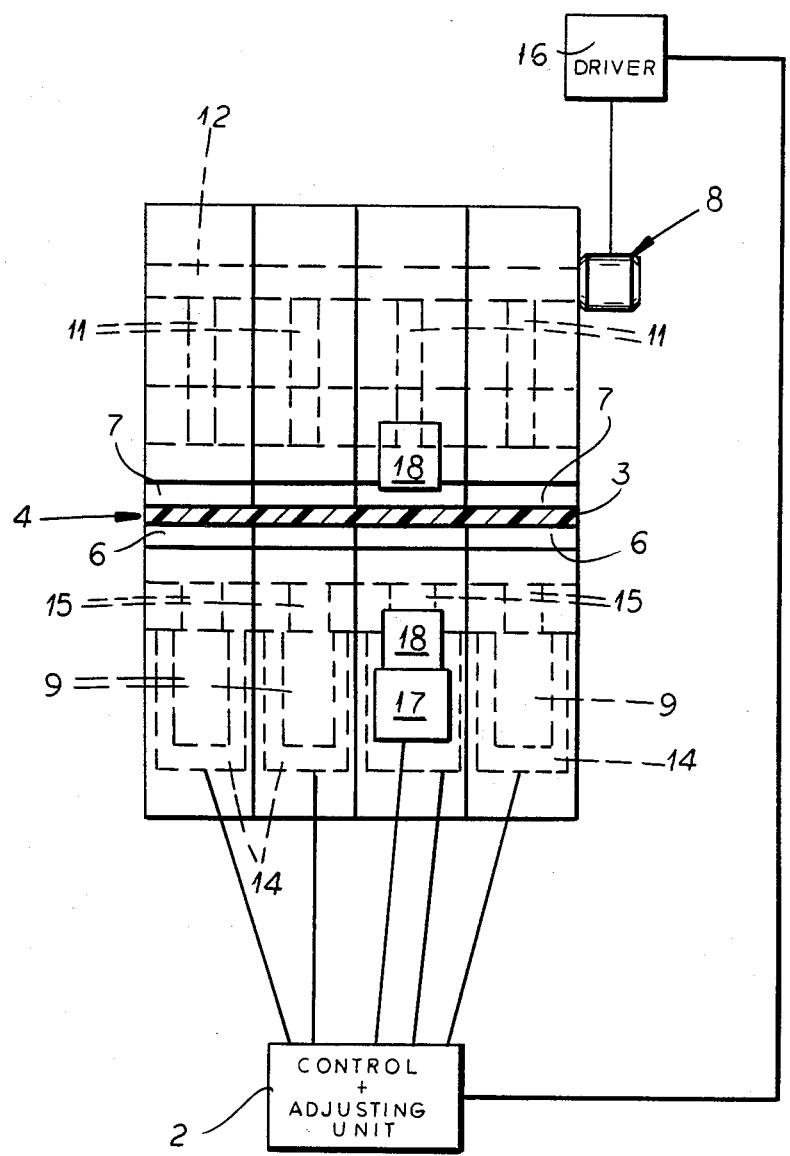
FIG. 2 is a front schematic view of the embodiment of the die unit according to FIG. 1.

In this specific example and according to a preferred embodiment of our invention the piezotranslator 9 is positioned in a heat insulated piezotranslator chamber 14 of the die body 5, from which a field translator push rod 15 of the piezotranslator is extendable, and operates on the output-gap-defining adjusting die lip 6. The piezotranslator chamber 14 can additionally be cooled. For the manufacture of flat sections of larger width, the output-gap-defining adjusting die lip 6 can be divided into sections perpendicular to the plane of the drawing, whereby the individual sections are connected to a piezotranslator 9. That is also true for the manufacture of round sections or of sections with rounded edges or regions, wherein correspondingly the output-gap-defining adjusting die lip 6 can be divided into sectors and these sectors are individually connected to a piezotranslator 9, as seen in FIG. 2.

In the specific example as adjusting motor 16 is provided for the opposing gap-bounding lip 7. The control and adjusting device 2 serves for control and adjustment of the gap size in the range of between 0.05 and 0.30 mm by the piezotranslator 9, for larger gap size adjustments the coarse adjusting mechanism 8 works by the adjusting motor 16. It should also be indicated that the control and adjusting device 2 is connected to a thickness measuring mechanism 17 with a measuring head 18, which measures thickness in the region of the already set or congealed plastic material 3, that is, as in the example, just behind the freezing line In this specific embodiment the arrangement is basically such that the output-gap-defining adjusting die lip 6 is adjustable against operation of the elastic restoring force. Consequently it can oscillate with a definite eigenfrequency. That is not a problem, since the piezotranslator 9 is so selected, that its resonance frequency is lower than the lowest eigenfrequency of this output-gap-defining adjusting die lip 6 and since the control and adjusting device 2 is constructed for a subsequent control signal, whose signal frequency is below the resonance frequency of the piezotranslator 9.

Figure 3:
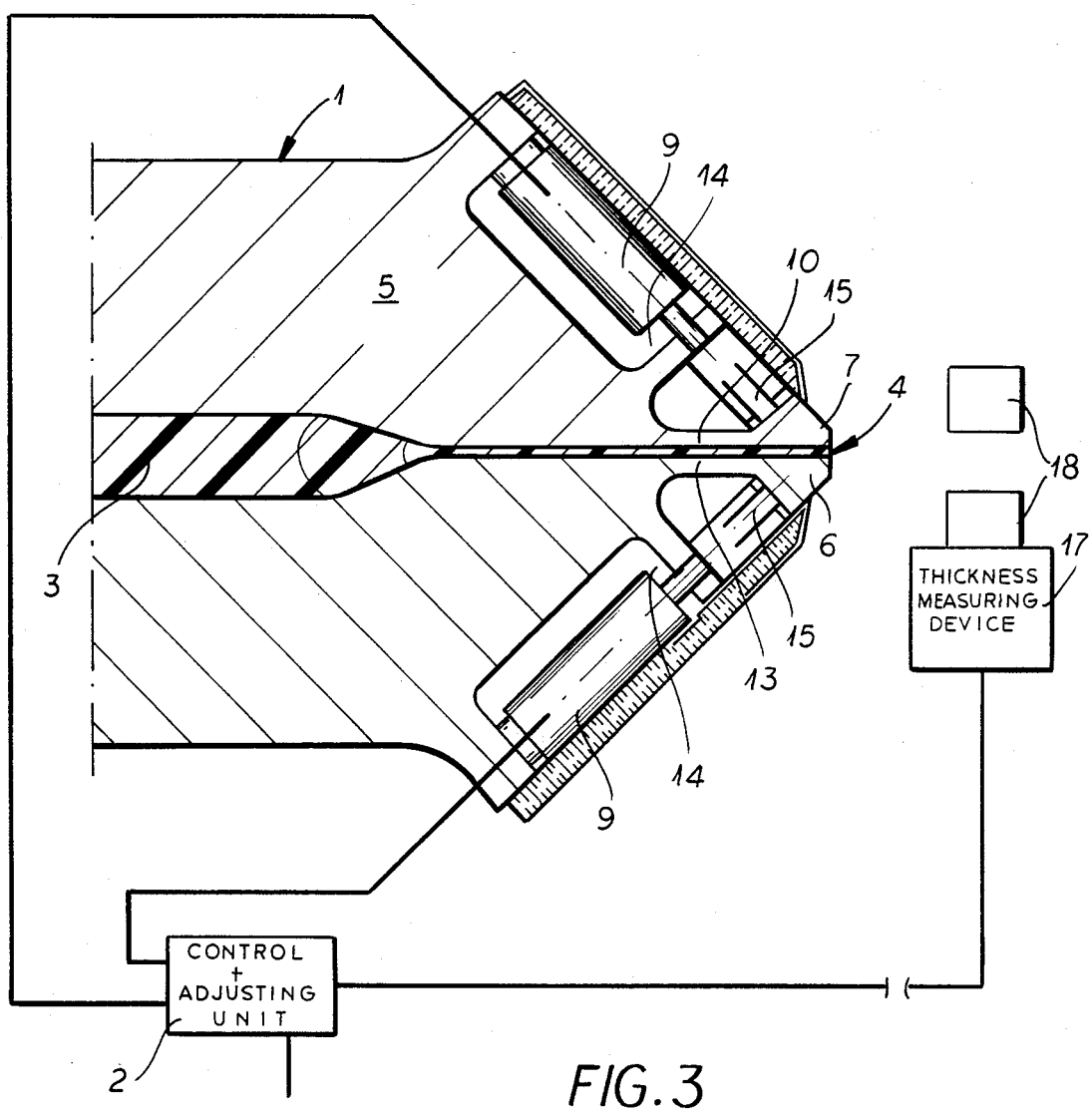
FIG. 3 is a partially cutaway vertical cross sectional, schematic view of a second embodiment of our invention.

A second embodiment of our invention is shown in FIG. 3 in which both the opposing gap-bounding lip 7 and the output-gap-defining adjustable die lip 6 are provided with adjusting elements which comprise a field translator 9 in a heat insulated chamber 14. Both field translators 9 are controlled with the aid of the associated control and adjusting device 2.

We claim:

1. In a die, for thermoplastic material, comprising at least one output-gap-defining adjustable die lip, an opposing gap-bounding lip, at least one adjusting element working on said output gap-defining adjustable die lip, and a control and adjusting device for regulating the thickness of the extruded plastic product operatively connected to said adjusting element, the improvement wherein said adjusting element is a field translator.

2. The improvement according to claim 1 wherein said output-gap-defining adjustable die lip is adjustable against the operation of an elastic restoring force and is oscillatable with a definite frequency, and said field translator has a resonance frequency below the lowest eigenfrequency of said output-gap-defining adjustable die lip, and said control and adjusting device outputs a control signal with frequency below said resonance frequency of said field translator.

3. The improvement according to claim 2 wherein said opposing gap-bounding lip is adjustable by means of a field translator with the aid of said control and adjusting device.

4. The improvement according to claim 1 wherein said field translator is a piezotranslator.

5. The improvement according to claim 1 wherein said field translator is a magnetostriction translator 6. The improvement according to claim 1 wherein said field translator is positioned in a heat-insulated field translator chamber.

7. The improvement according to claim 1 wherein said gap-defining adjustable die lip is divided into a plurality of individual sections, wherein each of said individual sections is connected to one of said field translators .

8. A die for imparting a predetermined thickness to a thermoplastic synthetic resin body which comprises;
   a pair of gap defining lips at least one of which is resiliently biased toward the other lip to define a thickness of a body passing between said lips;
   a field translator operatively connected to one of said lips;
   means for applying an electromagnetic field translator to induce a change in dimensions of said field translator; and
   means for measuring the thickness of said body connected to said means for applying said electromagnetic field to control the same.

9. The die defined in claim 8 wherein a respective field translator is connected to each of the lips.

10. The die defined in claim 9 wherein at least one of said field translators is a piezoelectric field translator.

11. The die defined in claim 9 wherein at least one of said field translators is a magnetostriction field translator.

* * * * *